March 23, 1965  C. E. NEWKIRK  3,174,557
IMPLEMENT ADJUSTING AND LIFTING LINKAGE
Filed Dec. 12, 1961  3 Sheets-Sheet 1

INVENTOR.
CLARENCE E. NEWKIRK
BY
George Douglas Jones
ATTORNEY

March 23, 1965  C. E. NEWKIRK  3,174,557
IMPLEMENT ADJUSTING AND LIFTING LINKAGE
Filed Dec. 12, 1961  3 Sheets-Sheet 2

INVENTOR.
CLARENCE E. NEWKIRK
BY
George Douglas Jones
ATTORNEY

March 23, 1965  C. E. NEWKIRK  3,174,557
IMPLEMENT ADJUSTING AND LIFTING LINKAGE
Filed Dec. 12, 1961  3 Sheets-Sheet 3

CLARENCE E. NEWKIRK
INVENTOR.

BY
George Douglas Jones.
ATTORNEY

United States Patent Office 3,174,557
Patented Mar. 23, 1965

3,174,557
IMPLEMENT ADJUSTING AND LIFTING
LINKAGE
Clarence E. Newkirk, 227 N. Emily St., Anaheim, Calif.
Filed Dec. 12, 1961, Ser. No. 158,743
4 Claims. (Cl. 172—319)

This invention relates to lifting, leveling and longitudinal vertical angular adjustment linkage for implement frames operatively in connection with the well known A type hitch or "Three Point" hitch common on large numbers of tractors today. The said hitch will throughout the following specification and claims, for convenience be referred to as an A type hitch.

Briefly, the A type hitch includes a pair of fluid actuated rearwardly extending arms operatively secured to each side of the lower rear transmission housing of a tractor and a third connecing point positioned on the rear upper portion of the tractor and centrally thereof, and this point hereafter, throughout the following specification and claims will be referred to as the "stub arm."

The normal attaching means for an A type hitch to an implement is to provide the said implement with three points or locations for attachment, two lower poinst in the same plane and in spaced apart relation and pivotally attached to the fluid actuated arms, and a third point of attachment is provided by an upstanding member secured to the implement frame and an arm pivotally attached thereto, the opposite end of the arm is pivotally attached to the "stub arm" on the tractor.

This type of hitch provides for the fluid actuated arms to raise and lower the implement frame, provided however, that the implement is not excessive in weight and is not required to be in longitudinal horizontal relation to the ground surface, and when the weight is in excess of the lifting capacity of the tractor, larger tractors must be used. With the A type hitch at various elevations of the implement in relation to the ground surface the implement frame cannot be set to maintain either a level or longitudinal angular relation to the ground surface.

It is also extremely important, that under certain working conditions the depth of the implement must be maintained at an even depth and therefore the implement frame should be set at the desired vertical longitudinal angle in relation to the ground or soil surface regardless of the elevation of the vertical longitudinal angle of the tractor. This is vital to good work in the many diversified problems encountered in working the soil, be it in argricultural or in industrial operations.

The present invention is directed to solve these two problems, namely, limited lifting power and maintaining the implement frame in parallel or in predetermined vertical or longitudinal angular relation to the ground or soil surface, at any elevation or space between the ground surface and the said frame regardless of the vertical longitudinal angle of the tractor.

The present invention will permit the lighter tractors to perform work normally requiring large powered tractors due to the unique and inexpensive linkage as set forth in the following specification and claimed in the appended claims.

The nature of the invention will be better understood from the following specification taken with the accompanying drawings in which several embodiments are illustrated and described.

Referring now to the drawings by numerals of reference within like numerals refer to like parts.

Figure 2:
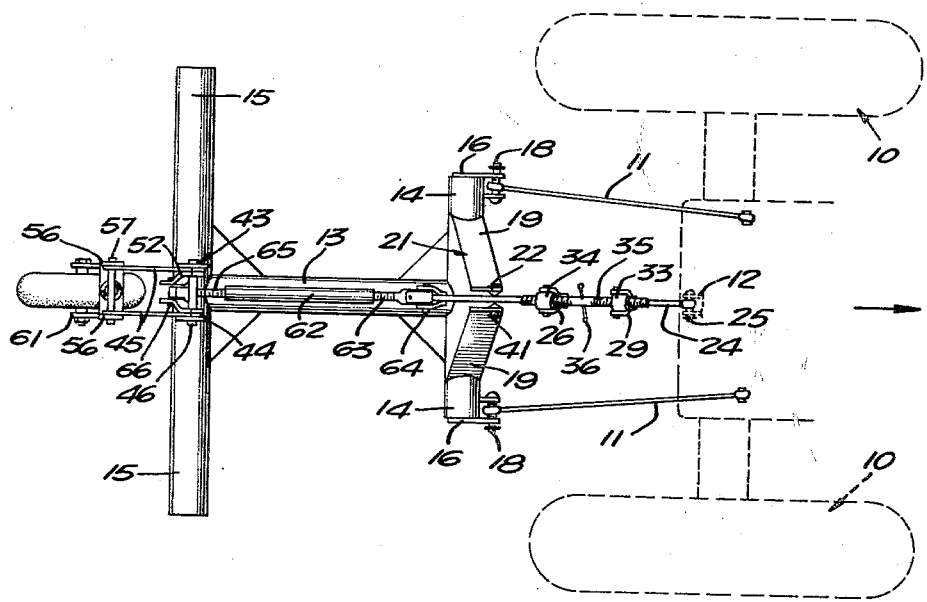
FIGURE 2 is a top plan view of the implement carrying frame and linkage therefor.
Figure 1:
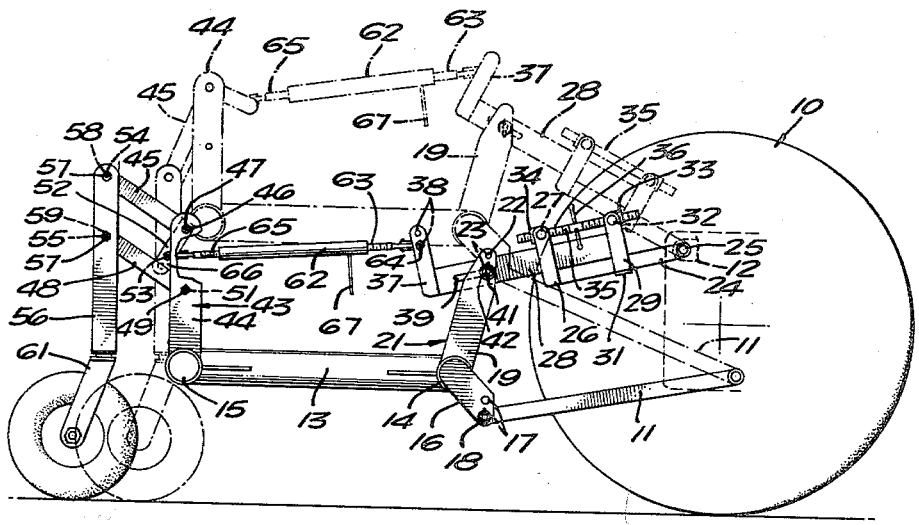
FIGURE 1 is a side view of the implement carrying frame of the present invention showing in elevation the linkage in working position and in dotted lines the implement in lifted position.

The mechanism including the adjustable linkage and operative means is best illustrated in FIGURES 1 and 2 of the drawings, wherein the numeral 10 indicates the outline of the rear wheel of a tractor equipped with a conventional A type hitch, in which 11 indicates the lower fluid actuated rearwardly extending arms secured to and operated from the lower portion of the tractor transmission housing, the "stub arm" 12 is secured to the upper rear portion of the said tractor transmission housing, the dotted line indicates the outline of the transmission housing of the tractor.

Figure 7:
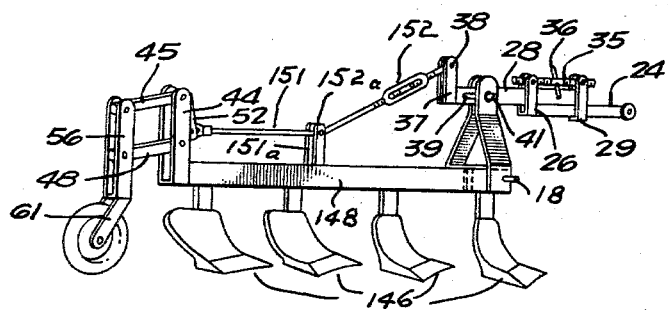
FIGURE 7 is a further modification of the linkage of the present invention when applied to a single implement carrying frame when the said frame is in horizontal angular relation to the front transverse member.
Figure 8:
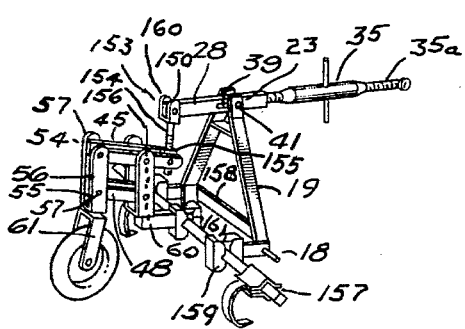
FIGURE 8 is a still further modification of the linkage of the present invention when applied to a close coupled implement carrying frame and rolling ground engaging member.

The principal structure of the invention comprises an implement carrying frame 13 having a front transverse member 14 and a rear transverse member 15 secured in spaced apart and opposed relation. For multiple gangs of implements, such as disc harrows and the like this type of frame is generally desirable, however, where single gangs such as field cultivators, scrapers, plows, hillers and the like are concerned the implement carrying frame as best illustrated in FIGURES 7 and 8 would be more desirable, these several implements with their carrying frames will be discussed in detail infra.

At each end of the front transverse member 14, forwardly depending arms 16 are rigidly secured, these arms may also be formed as a part of the said transverse member 14 without departing from the scope of the present invention, the opposite forward end of the said arms 16 are provided with a plurality of vertically spaced apart apertures 17, the rearwardly extending arms 11 are pivotally secured to the said depending arms 16 by means of pins 18 positioned in apertures 17.

It should be here noted that the plurality of apertures 17 are provided to quickly and easily adjust the hitch to fit varying diameters of rear tractor wheels.

Centrally positioned intermediate the ends of the front transverse member 14 and rigidly secured thereto is an upstanding member 19, preferably formed for rigidity is an A-shaped member 21, the apex 22 of the A is preferably open and provided with a plurality of vertically spaced apart apertures 23 and it should be noted that the spacing of the apertures 23 should correspond to the spacing of apertures 17 as explained supra. While the support is described as an A-shaped structure, any suitable upstanding rigid structure may be employed.

Pivotally attached to the "stub arm" 12 of the tractor is a leg 24 of a telescoping structure and secured thereto by pin 25, the opposite end of the said leg 24 of the telescoping structure is formed as an upstanding U 26 having apertures 27 positioned in the upper portion of the legs of the U 26.

A rearwardly extending leg 28 of the said telescoping structure is formed at the forward end with a pair of side members 29, secured to each side of the said leg 28, the bottom portion of member 29 thereof being closed by securing a member 31 thereto, the upper portion of the sides 29 have apertures 32 therethrough. The said apertures 27 and 32 are provided for the insertion of screw threaded swivel blocks 33 and 34, and screw threaded adjusting member is positioned within the said swivel blocks 33 and 34, the said member 35 is provided with a handle 36 for ease of adjustment of the telescoping legs 24 and 28.

The rear portion of leg 28 is formed as an upright lever arm member 37 having a plurality of apertures 38 in spaced apart vertical relation therethrough. In leg 28 and adjacent the upright lever arm member 37 is an elongated slot 39 and apertures 23 of apex 22 in the A-shaped member 21 and pin 41 retain the said slot 39 in slidable relation therewith; the said pin 41 is secured by any conventional means such as pins 42 positioned in each end of pin 41.

An upright structure 43 is rigidly secured to the rear transverse member 15, which includes a pair of spaced apart upright members 44 in transverse spaced apart relation. Parallelogram means comprising the following structure are pivotally secured in operative relation to the said structure 44, and include a pair of arms 45 pivotally secured by means of pins 46 through apertures 47 in the upper portion of the upright members 44.

A pair of arms 48 are pivotally secured in vertically spaced apart relation to arms 45 by means of pins 49 through apertures 51. Arms 45 are provided with depending legs 52 directed in downward positions and substantially at right angles to arms 45. Apertures 53 are positioned adjacent the ends thereof, however bell crank means may be used in place of the parallelogram structure without departing from the scope of the present invention.

The arms 45 and 48 at their opposite ends are provided with apertures 54 and 55 and pivotally secured in spaced apart relation to an upstanding structure 56 by means of pins 57 or the like positioned in apertures 58 and 59 in the said structure 56. It should be noted that the spacing of apertures 47 and 51 are substantially the same as the spacing of apertures 54 and 55.

The said upstanding structure 56 is provided to carry a rolling ground engaging member 61 which is illustrated as a caster wheel, however, any suitable means for support of the frame may be used such as a skid provided with a swivel attachment or the like.

A longitudinal adjustable member 62 is preferably a tubular member, internally threaded into which is positioned in screw threaded relation a front member 63 pivotally attached to a pin 64 secured in aperture 38, the rear portion of the adjustable member 62 has therein positioned in screw threaded relation a rear member 65 pivotally attached by means of pin 66 positioned in aperture 53 of the depending leg 52. The spacing of apertures 53 in leg 52 should correspond to the spacing of apertures 38 in upright lever arm member 37.

The adjusting member 62 provides for adjusting of the rolling ground engaging member 61 which permits adjustment of the rear portion of frame 13 to be positioned at any reasonably desired longitudinal angular relation to the ground surface, the handle 67 is secured to the member 62 for the purpose of ease of adjusting the same.

It should be noted that this longitudinal angular adjustment of the frame in relation to the ground surface is substantially constant, regardless of the elevation of the frame and/or the longitudinal angular relation of the tractor to the ground surface.

Figure 4:
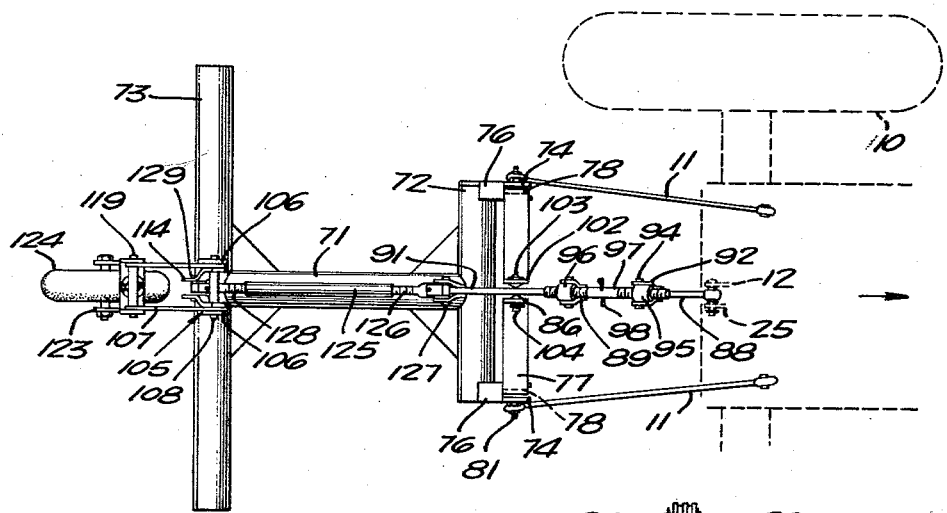
FIGURE 4 is a top plan view of the modification illustrated in FIGURE 3 of the drawings.
Figure 5:
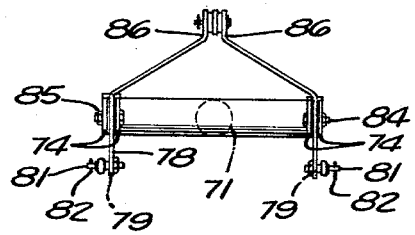
FIGURE 5 is a front elevation of the upstanding structure of FIGURE 3 and secured to the front transverse member of the frame.
Figure 3:
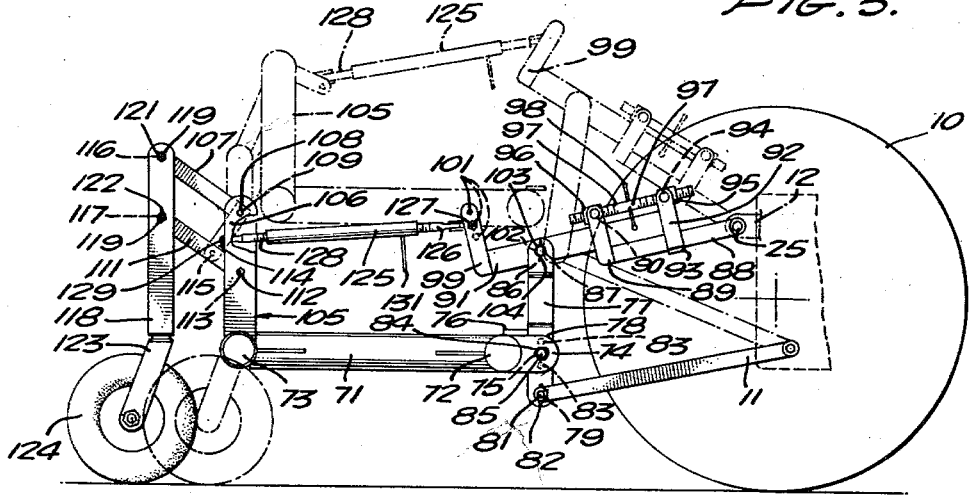
FIGURE 3 is a side elevation of a modification of the implement carrying frame of the present invention, showing in detail the linkage of the modification of the invention and in dotted lines when the frame is in lifted position.

FIGURES 3, 4 and 5 of the drawings illustrate a modification of the present invention intended as an inexpensive linkage means and providing a slight variation of the said invention as illustrated in FIGURES 1 and 2 and described supra.

Referring now to the modification of the present invention as illustrated in FIGURES 3, 4, and 5 of the drawings:

On a longitudinal main frame 71, each end of which is rigidly secured to a front transverse member 72 and a rear transverse member 73, the front transverse member 72 at each end thereof is preferably provided with a pair of transversely spaced apart members 74 extending forwardly of the front transverse member 72 and having a plurality of vertically spaced apart apertures 83 therethrough. Adjacent the front transverse member 72 and rigidly secured thereto and to the upper portion thereof of member 74 is a stop member 76; it should be here noted that the said stop member 76 may be adjustably secured to the said members 74 without departing from the scope of the invention and the appended claims.

There is an extended yoke member 77 the lower portion of which comprises vertically spaced apart depending legs 78, the lower end of the said legs having apertures 79 therethrough into which are secured attaching means 81 for connection to the lower fluid actuated arms 11 of the A type hitch and secured thereto by any conventional means such as pins 82.

Intermediate the said legs 78 and adjacent the lower ends thereof, are positioned apertures 83 in spaced apart relation, the said legs are pivotally secured by means of bolts 84 through aperture 75, the said bolts are secured by means of nuts 85. The positioned adjustment of the connecting arms 11 to the attaching means 81 when larger or smaller diameter tractor wheels are used are made by moving legs 78 into the upper or lower apertures 83.

The upper end of the said extended yoke 77 is provided with vertically spaced apart members 86 and apertures 87 positioned adjacent the upper ends thereof.

Pivotally attached to the "stub arm" 12 of the tractor is a leg 88 of a telescoping structure and secured thereto by pin 25, the opposite end of the said leg 88 is formed of an upstanding U 89 having apertures 90 adjacent the ends thereof.

A rearwardly extending leg 91 of the said telescoping structure is formed at the forward end with a pair of side members 92 secured to each side of the said leg 91, the bottom portion thereof being closed by securing a member 93 thereto. The upper portion of the said sides 92 having apertures 94 therethrough; the said apertures 94 are provided for the insertion of screw threaded swivel blocks 95 and 96; screw threaded member 97 with handle 98 is screw threaded into the said blocks 95 and 96 to provide for adjustment of the said telescoping structure.

The rear portion of leg 91 is formed as an upright lever arm member 99 having a plurality of vertically spaced apart apertures 101 adjacent the outer end thereof.

An aperture 102 adjacent the upright lever arm member 99 of the said rearwardly extending leg 91 is positioned to register with the aperture 87 in spaced apart relation to members 86 and pivotally secured thereto by any suitable means such as pin 103, the said pin is secured in place by pins 104 in each end thereof.

An upright structure 105 is rigidly secured to the rear transverse member 73, which includes a pair of transversely spaced apart upright members 106. Parallelogram means comprising the following structure are pivotally secured in operative relation to the said structure 105 and include a pair of arms 107 pivotally secured by means of pins 108 through apertures 109 in the upper portion of the upright members 106.

A pair of arms 111 are pivotally secured in vertically spaced apart relation to arms 107 by means of pins 112 through apertures 113 in upright members 106. It should be noted that arms 107 have depending legs 114 positioned substantially at right angles to arms 107 the lower ends of which are provided with a plurality of apertures 115 in spaced apart vertical relation. The spacing of the said apertures 115 should correspond with the spacing of apertures 101 in the upright lever arm member 99.

The arms 107 and 111 at their opposite ends are provided with apertures 116 and 117 respectively and are pivotally secured in vertically spaced apart relation to the upstanding structure 118 by means of pins 119 or the like positioned in apertures 121 and 122 respectively.

The said upstanding structure 118 is preferably provided with a swivel yoke 123 which carries a caster wheel 124; however the ground engaging means may be other types such as a swivel skid or the like without departing from the present invention.

A longitudinal adjustable member 125 is preferably a tubular member internally threaded, into which is positioned in screw threaded relation, a front member 126 pivotally attached to a pin 127 in aperture 101 in the upright lever arm member 99. There is a rear portion of the adjustable member 125 into which is positioned and in screw threaded relation a rear member 128 pivotally attached by means of pin 129 through aperture 115 of the depending leg member 114.

This adjusting member 125 provides means for adjustment of the rear portion of the frame 71, thus positioning the same in any reasonably desired longitudinal angular relation to the ground surface and independent of the longitudinal angular relation of the tractor to the ground surface. The handle 131 is secured to the adjustable member 125 for the purpose of ease of adjusting the same.

Figure 6:
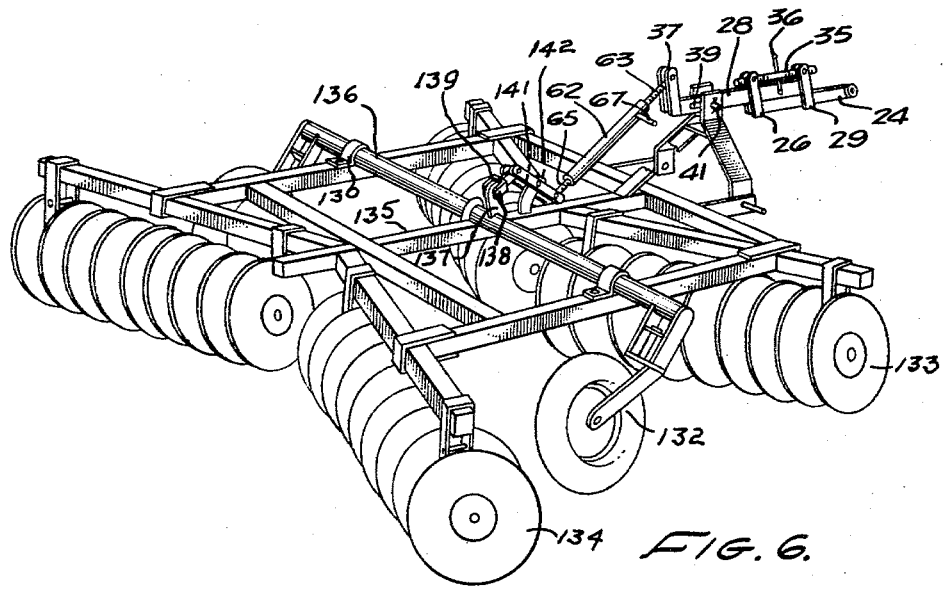
FIGURE 6 is a further modification of the linkage of the present invention when the rolling ground engaging means is positioned intermediate the front and rear mounted soil working tools.

Referring now to FIGURE 6 of the drawings which illustrates the application of the principle of the instant invention for the operation of a tandem disc harrow or similar soil working implements wherein the rolling ground engaging members 132 are positioned intermediate the front discs 133 and the rear discs 134.

The frame structure 135 is of the conventional type for such implements as tandem disc harrows and the like and supports a preferably tubular member 136 journaled in bearings 130, the said bearings being secured to the frame structure 135, the ends of the tubular member 136 carries the rolling ground engaging members 132.

Intermediate the ends of the said tubular member 136 and rigidly secured thereto is an upstanding arm 137 having an aperture 138 therethrough, a yoke 139 is pivotally secured by any conventional means thereto, the opposite end of the yoke 139 is pivotally secured to one end of the rocker arm 141, the said rocker arm being centrally pivoted to an upstanding supporting member 142 rigidly secured to the frame 135 and adjacent the upstanding arm 137, the opposite end of the said rocker arm is pivotally attached to the tubular internally threaded rear adjusting member 62, the front member 63 thereof being in screw threaded relation with the adjusting member 62 and the front end thereof attached in pivotal relation to the upright member 37. The rearwardly extending leg 28 is provided with an elongated slot 39 adjacent the upstanding member 37 and secured in slidable relation to the upper portion of the upstanding member 19.

The said leg 28 is adjustably associated with leg 24 the open end of which is pivotally attached to the "stub arm" 12 (FIG. 1) of the tractor and the fluid actuated arms of the A type hitch pivotally attached to the members 18—18.

It should now be noted that the linkage means, yoke 139, rocker arm 141, adjustable member 62, upright member 37, leg 28, and leg 24 secured to the "stub arm" 12 of the tractor comprise the means, when actuated by the fluid actuated arms to cause pressure on the rolling ground engaging means to thereby assist in lifting the frame 135 and the component parts thereof. In nontechnical terms the compound linkage and lower fluid actuated arms are so arranged to provide means for forcing pressure on the ground engaging means thereby exerting a lifting force on the frame 135 and implement attached thereto.

Referring now to FIGURE 7 of the drawings, the implement illustrated is a frame structure 148 and attached thereto in depending position are a plurality of mouldboard plows 146.

The lifting linkage follows the linkage as illustrated in FIGURES 1 and 2 of the drawings and described supra with the following exception; a flexible member such as a cable 151 or the like is attached to an adjusting member 152 which is pivotally connected to the upright member 37, the opposite end of the flexible member 151 being pivotally attached to depending leg 52 of the arm 45. An upstanding member 151a is secured to the frame 148 and at the upper end thereof is positioned a rolling member or sheave 152a to support the flexible member 151.

It should be understood that the flexible member 151 is used when the frame structure 148 is of necessity constructed in horizontal longitudinal angular relation to the direction of travel of the implement; in the instant case it is used in order that the mould board plows may correctly function.

In this connection it should be noted that the instant invention permits the use of rigid or flexible linkage means, due to the principle of the said invention, which linkage is under tension in order to apply pressure of the ground engaging member to the surface on which the said ground engaging member functions.

Referring now to FIGURE 8 of the drawings which illustrates a further modification of the linkage arrangement as adapted to a close coupled implement which is illustrated as a cultivator, however, similar frame structure may include the mounting of a blade used for earth movement for industrial application, or it may be used for mounting seeders, diggers or the like.

The frame as illustrated in FIGURE 8 of the drawings is similar in structure to the frame 19 of FIGURE 1 of the drawings, the pins 18 receive the lower fluid actuated arms 11 and the apex of the structure is open having apertures 23 in opposed relation therein.

In the leg 28 adjacent the rear end thereof a slot 39 is positioned therethrough and the rear end of the said leg 28 is provided with an aperture 160 therethrough, the opposite end of the said leg 28 is secured in screw threaded relation to the adjusting member 35 and the end 35a is pivotally attached to the "stub arm" of the tractor, pin 41 is inserted through aperture 23 and slot 39 to permit sliding movement of the said leg 28.

The modification of the linkage resides in the fact that the leg 28 ends in a horizontal plane as the upright lever arm member 37 in FIGURE 1 is eliminated. Adjacent the end portion of the said leg 28 is an aperture 160 through which pin 150 is inserted to pivotally retain the yoke 153, an extended portion 154 of the said yoke is in screw threaded relation with swivel member 155 being pivotally attached to extended leg 156 of parallel arms 45.

The tool bar 157 is secured to the frame 158 by means of clamps 159 and the upright members 44 are secured to the tool bar 157 by means of clamps 161.

Upstanding members 44 are provided with vertically spaced apart apertures 60 which are pivotally secured to parallel arms 45 and 48, the opposite ends of which are pivotally secured by means of pins 57 in apertures 54 and 55 in the upstanding structure 56 to which is attached in swivel relation a ground engaging member 61 and it should be understood that any conventional type of ground engaging member may be used, such as a swivel skid or the like.

The function of the linkage of the instant invention is to provide means to assist or aid the fluid actuated rearwardly extending arms operatively attached to the lower rear housing of a tractor.

On all A type hitches as in use today the leverage arm of the fluid actuated members is limited in its lifting power to raise implements attached to it and therefore the operation or use of the tractors is restricted to the size of the implement regardless of the fact that the tractor has sufficient power to pull or push the implements which of necessity must be lifted in order to do an efficient job.

In the conventional A type hitch the fluid actuated arms are secured to the frame of the implement and a third member pivotally secured to an upstanding structure secured to the frame of the implement the opposite end of which is pivotally secured to the "stub arm" of the tractor.

It is obvious that for the fluid actuated arms as they lift the implement there is no aid or assistance from the connection to the "stub arm" on the tractor, in fact, that connection to the "stub arm" has a resisting rather than an assisting action. The instant invention eliminates this fault by transferring or rather utilizing this resistance of the "stub arm" connection, to aid in providing the means to permit excessive loads to be lifted and with ease.

This is accomplished by providing an elongated slot in the arm connecting the upstanding member secured to the frame of the implement to the "stub arm" on the tractor together with the linkage associated therewith all of which is designed to use tension in place of compression by associating the linkage with designed leverage means and by so doing to apply pressure to the ground engaging member and by so doing to assist in raising the implement.

As the linkage arm connected to the "stub arm" on the tractor is free to move in its attachment to the upstanding member secured to the implement frame as the fluid actuated arms move to lift the implement, a tension force through the leverage of the linkage exerts a pressure force, the amount of which is determined by the weight on the ground engaging member.

While a preferred embodiment of the instant invention resides in the adjustable leg attached to the "stub arm" of the tractor, being provided with an elongated slot and secured in slidable relation to the upstanding member of the frame, a somewhat similar action may be secured in the embodiment as best illustrated in FIGURES 3, 4 and 5 of the drawings, wherein the yoke member is pivoted to the leg attached to the "stub arm" of the tractor and also pivoted adjacent its opposite end to the frame structure and the end of the yoke is secured to the fluid actuated arms.

It should be noted that this structure also permits limited movement of the leg and therefore it should be obvious that the linkage and leverage produce pressure on the ground engaging members.

It should therefore be apparent to those interested in soil equipment that the very simple and inexpensive linkage together with the leverage as set forth in the instant invention has turned loss of power into a gain in power.

Having fully described my invention, it is to be understood that I do not wish to be limited to the details herein set forth, but my invention is of the full scope of the appended claims.

I claim:

1. In an implement carrying frame having front and rear transverse members for connection to a conventional A type hitch of a power unit, the fluid actuated arms of the said A type hitch being pivotally attached to each end of the said front transverse member and a "stub arm" positioned adjacent the upper central rear portion of the power unit, an upstanding member secured centrally of the said front transverse member, an adjustable arm member provided for connection to the "stub arm" of the said A type hitch and having a longitudinal slot positioned towards the rear portion thereof, the said slot being in slidable relation and secured to the upper portion of the said upstanding member, adjustable linkage means pivotally secured to the end of the said adjustable arm adjacent the said slot, the opposite end of the last mentioned linkage means being pivotally secured to parallel arms, the said arms pivotally secured to an upstanding member secured to the rear transverse member of the said frame, the opposite ends of the said parallel arms being pivotally secured to a rolling ground engaging structure, the said linkage comprising means for raising, lowering and maintaining predetermined longitudinal angular relation of the said frame to the ground surface when the said implement carrying frame is attached to a conventional A type hitch and operatively associated therewith.

2. In combination with a fluid actuated A type hitch forming a part of a mobile power unit, the said hitch including a pair of fluid actuated arms secured to and in operative position on the lower sides of the rear portion of the said power unit, a "stub arm" positioned at the central upper rear end portion of the said power unit, an implement supporting frame structure having a front transverse member the pair of fluid actuated arms pivotally secured to each end of the front transverse member of the said frame structure, an upstanding member secured to the front transverse member of the said frame and intermediate the ends thereof, telescoping arms, one end of which is pivotally secured to the said "stub arm," the opposite end of the said telescoping arms being formed with an upstanding leg, and having an elongated slot positioned in and adjacent to the upstanding leg of the said telescoping arms, a pin member secured to the said upstanding member adjacent the upper end thereof, the said pin projecting through the said elongated slot to permit restricted movement of the said telescoping arms, an adjustable linkage member pivotally secured to the upstanding leg of the said telescoping arms and the opposite end thereof associated in operative relation to parallel arms pivotally secured to the rear portion of the said supporting frame structure and to a ground engaging member, the said linkage members being actuated when the fluid actuated arms are caused to function, whereby the said ground engaging member is caused to urge the said implement supporting frame structure in a vertical plane maintaining the said frame in substantially predetermined longitudinal angular relation with the ground surface when the said implement supporting frame structure is in lifted or working position.

3. A conventional A type hitch forming a part of the mechanism of a tractor, including a pair of fluid actuated arms secured in operative relation to each side of the lower portion of the rear housing of the said tractor and extending rearwardly therefrom, a "stub arm" positioned centrally in the upper portion of the rear housing of the said tractor, in combination with an implement supporting frame, the said frame comprising front and rear transverse members secured in spaced apart relation, the said rearwardly extending fluid actuated arms which are pivotally secured to each end of the front transverse member, an upstanding member secured to and intermediate the ends of the said front transverse member, an adjustable arm pivotally secured to the said "stub arm" and provided with a longitudinal slot adjacent the rear end in the said adjustable arm, the said slot being in restricted slidable relation with and secured to the upper portion of the said upstanding member, the rear end of the said adjustable arm being formed in upstanding relation thereto and to which adjacent the end thereof is pivotally secured an adjustable linkage member, the opposite end of the said linkage member being pivotally secured to parallel arms being pivotally secured to the rear transverse member of the implement frame, the opposite ends of the said parallel arms being pivotally secured to a rolling ground engaging member, so that upon movement of the said lower fluid actuated arms in a lifting action, pressure through the linkage means is applied to the said rolling ground engaging member assisting in lifting and maintaining the implement supporting frame in parallel and/or predetermined longitudinal angular relation throughout the lifting and working positions of the said implement supporting frame.

4. In an implement supporting frame structure operatively attached to an A type hitch forming a part of a mobile power unit including a pair of lower positioned fluid actuated rearwardly extending arms and a "stub arm" centrally positioned in the rear upper portion of the said power unit, the said frame comprising front and rear transverse members and means securing the same in spaced apart relation, the front transverse member having depending arms at each end thereof and intermediate the said ends being secured to an A member, the legs of which are rigidly secured to the said front transverse member, the apex of the said A member being open, the two fluid actuated rearwardly extending arms of the said hitch being pivotally connected to the said depending arms of the front transverse member, an adjustable arm member, one end of which is pivotally attached to the said "stub arm" of the A type hitch, adjacent the opposite end the said adjustable arm having a slot comprising an elongated opening therethrough and the end of the adjustable arm being formed with an upstanding portion, a pin being positioned through the open apex of the A member and through the said slot in said adjustable arm, to support the same in slidable relation therewith, an adjustable link member having a connecting member pivotally secured to the upstanding portion of the adjustable arm member the opposite end of the said adjustable link member attached to a depending arm of a pair of parallel arm members, the said parallel arms having their opposite ends pivotally secured to a frame structure supporting a rolling ground engaging member, and pivotally supported by an upstanding structure secured to the rear transverse member of the said frame structure, whereupon, upon movement of the said fluid actuated arms of the A type hitch there is produced through the said linkage a force upon the rolling ground member to assist in lifting the said frame and to maintain the same in predetermined longitudinal angular relation to the ground surface at any normal working or lifted position of the said frame.

References Cited by the Examiner
UNITED STATES PATENTS

| | | | |
|---|---|---|---|
| 2,098,472 | 11/37 | Strandlund | 172—319 |
| 2,608,145 | 8/52 | Knapp | 172—319 |
| 2,673,505 | 3/54 | Altgelt | 172—445 X |
| 2,704,496 | 3/55 | Taylor | 172—239 |
| 2,762,140 | 9/56 | Elfes | 172—447 X |
| 2,968,356 | 1/61 | Mydels | 172—446 X |
| 3,059,706 | 10/62 | Morkoski | 172—445 |
| 3,061,020 | 10/62 | Mannheim | 172—285 |

OTHER REFERENCES

German application 1,070,432, December 1959 (addition to German Patent) 1,029,604.

German application 1,088,748, September 1960.

T. GRAHAM CRAVER, *Primary Examiner.*

A. JOSEPH GOLDBERG, *Examiner.*